United States Patent [19]

Côté

[11] Patent Number: 5,083,594
[45] Date of Patent: Jan. 28, 1992

[54] DELIMBER BOOM

[76] Inventor: Jean-Marie Côté, 14828 Labelle, Pierrefonds, Quebec H9H 1J3, Canada

[21] Appl. No.: 627,200

[22] Filed: Dec. 13, 1990

[30] Foreign Application Priority Data

Jun. 28, 1990 [CA] Canada ................................ 2020112

[51] Int. Cl.$^5$ .......................... A01G 23/08; B27C 9/00
[52] U.S. Cl. .................................... 144/2 Z; 144/3 D; 144/342
[58] Field of Search .............. 144/2 Z, 3 D, 335, 338, 144/343; 414/690, 692, 705, 718; 212/255, 256

[56] References Cited

U.S. PATENT DOCUMENTS

| | | | |
|---|---|---|---|
| 4,413,661 | 11/1983 | Marchildon | 144/343 |
| 4,428,407 | 1/1984 | Bourbeau | 144/2 Z |
| 4,582,104 | 4/1986 | Sigouin | 144/343 |
| 4,779,653 | 10/1988 | Denis | 144/343 |

FOREIGN PATENT DOCUMENTS 1116053  1/1982  Canada .
1275027 10/1990  Canada .

*Primary Examiner*—W. Donald Bray

[57] ABSTRACT

An improved boom construction on a tree delimber. The boom construction has a boom support and a boom assembly pivotally connected to the boom support. Locking means are provided for locking the boom assembly to the boom support in a working position of the delimber. The locking means are movable to an unlocked position allowing the boom assembly to pivot relative to the boom support in setting the delimber up in a travel position. Moving means are provided for both moving the locking means between locked and unlocked positions and for pivoting the boom assembly relative to the boom support. Means are also provided for preventing lateral movement between the boom assembly and the boom support when in the working position.

19 Claims, 2 Drawing Sheets

DELIMBER BOOM

BACKGROUND OF THE INVENTION

1. Field of the Invention

This invention is directed toward an improved boom construction incorporating a boom assembly.

The invention is more particularly directed toward an improved tree delimber machine having a boom assembly.

2. Description of the Prior Art

Tree delimber machines normally employ a long boom assembly mounted on a vehicle via an upright boom support. The boom assembly can comprise a boom slidably mounted through a sleeve. The outer end of the boom is equipped with tree gripping and delimbing means. The sleeve has tree gripping means at its front end. The boom support can be tilted forwardly on the vehicle by means of an extensible, rigid link pivotally connected between the boom support and the vehicle. Tilting the boom support lowers the front end of the boom, when it is extended from the sleeve, so it can pick up a tree lying on the ground by its butt end with the tree gripping means. The boom member is then withdrawn through the sleeve bringing the butt end of the tree with it until the butt end can be grasped by the tree gripping means on the sleeve. The tree gripping means on the boom then releases the tree and the boom is again moved forward to have the tree delimbing means on the boom delimb the tree while it is held by its butt end by the tree gripping means on the sleeve. The boom assembly and boom support are then operated to deposit the delimbed tree in the desired location preparatory to delimbing the next tree. This type of tree delimber machine is well known.

The tree delimber machines have the long boom assembly located relatively high above the ground when in the working position in order to function properly. However when the boom assembly is in the working position on the delimber machine, the delimber machine is not particularly suited for travelling from one work site to another. With the boom assembly located relatively high above the ground, the center of gravity of the machine is high making the machine relatively unstable and great care must be taken not to upset the machine during travel. While the boom support can be tilted forwardly with the extensible rigid link to lower the center of gravity of the machine, the rear end of the long boom assembly is raised during this operation making it impossible for the machine to pass under most bridges. Even without tilting the boom support forwardly, and thereby raising the rear end of the boom assembly, the machine is quite high and passage under many bridges is impossible. Also, the raised rear end of the boom assembly on the machine may exceed a legal height limit imposed on machines travelling on roads.

To move the tree delimber machines from one work site to another it was previously necessary to disconnect the boom assembly from the boom support. The boom support on the vehicle was lowered and both the vehicle and the disconnected boom assembly were moved to the new work site. At the new work site, the boom assembly was reconnected to the boom support and raised by the boom support to its working position. This operation however was time consuming and required additional lifting and handling apparatus.

It was then found that the tree delimber machine could more easily be placed in a transport mode by mounting the boom assembly to the boom support with hinge means. With the boom assembly pivotally mounted to the boom support, the boom support could be pivoted down relative to the vehicle while the boom assembly was being tilted upwardly relative to the boom support. This maintained the boom assembly generally parallel to the ground while both it and the boom support were being lowered so as to reduce the overall height of the machine. The boom assembly remained connected to the boom support. In the working position of the boom assembly, the boom assembly was locked to the boom support, usually with a plurality of bolts. However, when it was time to move the machine from one work site to another, the bolts were removed allowing the boom assembly to pivot relative to the boom support and allowing the boom assembly to be lowered without disconnecting it from the vehicle. With the machine now in a travel position, it was moved to a new work site. At the new work site, the boom support was raised back to an upright position thereby also raising the boom assembly. As the boom assembly was raised it pivoted relative to the boom support to maintain a generally parallel position to the ground. Once the boom support was fully raised to place the machine back in a working position the boom assembly was again locked to the boom support with the bolts. An example of the above machine is shown in Canadian Patent 1,116,053 by way of example.

While the above machine, employing a pivot connection between the boom assembly and the boom support, simplified moving the machine from one work site to another, there was still considerable work involved in locking and unlocking the boom assembly to and from the boom support. Also the relative movement of the boom assembly to the boom support while unlocked was difficult to control.

Another solution to setting up the machine in a travel position involved providing second extensible rigid link means pivotally connected between the boom support and the boom assembly. Normally with the boom assembly in the raised, working position the second link means is locked in place locking the boom assembly to the boom support. When it is desired to change the machine from a working mode to a travel mode however, the second link means is unlocked allowing it to extend and to pivot the boom assembly away from the boom support about the hinge means connecting them as the boom support is being lowered by the first link means. The second link means maintains the boom assembly generally parallel to the ground as the boom assembly is being lowered to a travel position. An example of this system is shown in Canadian Patent 1,275,027. This system places a great strain on the second link means however resulting in frequent maintenance and replacement of the second link means. Also, the second link means are mounted in an exposed position and are vulnerable to damage when the machine is working.

SUMMARY OF THE INVENTION

It is the purpose of the present invention to provide an improved boom construction having a boom assembly mounted on a boom support that has improved means for quickly and easily setting up the boom assembly in a working mode or in a travel mode.

It is another purpose of the present invention to provide an improved boom construction having a boom assembly pivotally connected to a boom support with improved means for locking and unlocking the boom support and boom assembly together.

It is a further purpose of the present invention to provide improved means for pivoting the boom assembly relative to the boom support when moving the boom assembly between a working position and a travel position.

It is yet another purpose of the present invention to provide an improved connection between the boom assembly and the boom support when the boom assembly is in the working position.

In accordance with the present invention there are provided locking means for locking the boom assembly and the boom support together in a working position. The locking means can be moved from a locked to an unlocked position to allow the boom assembly to pivot relative to the boom support when preparing to travel.

Further in accordance with the present invention there are provided improved extensible link means for pivoting the boom assembly relative to the boom support about the hinge means connecting them together when preparing to travel.

Preferably, in accordance with the present invention, the extensible link means that pivot the boom assembly relative to the boom support also are used to move the locking means between locked and unlocked positions.

Also in accordance with the present invention means are provided for securely connecting the boom assembly and boom support together in the working position while minimizing any lateral movement between them.

The invention is particularly directed toward an improved boom construction having a boom support, a boom assembly, and hinge means pivotally connecting the boom assembly to the boom support. Locking means in a first position lock the boom assembly to the boom support in a working position of the boom assembly. The locking means are movable to a second position to allow the boom assembly to pivot about the hinge means relative to the boom support.

The invention is also directed toward an improved boom construction having a boom support, a boom assembly, and hinge means pivotally connecting the boom assembly to the boom support. Moving means are provided for pivoting the boom assembly relative to the boom support about the hinge means. The moving means are pivotally connected between the boom assembly and the boom support. The pivotal connection to the boom assembly is located above the hinge means.

The invention is further particularly directed toward an improved tree delimber having a boom support; a delimbing boom assembly and hinge means pivotally connecting the delimbing boom assembly to the top of the boom support with the boom assembly resting on the boom support in its working position. Locking means are provided for locking the delimbing boom assembly to the boom support in its working position to prevent the boom assembly from pivoting about the hinge means away from the top of the boom support. Moving means are also provided for moving the locking means to unlock the boom assembly from the boom support to allow the boom assembly to pivot about the hinge means away from the top of the boom support.

The invention is also particularly directed toward an improved boom construction having a boom support; a boom assembly and hinge means pivotally connecting the boom assembly to the top of the boom support with the delimbing boom assembly resting on the top of the boom support in its working position. Cooperating means are provided on the boom assembly and boom support for preventing lateral movement between them when the boom assembly rests on top of the boom support in its working position.

DESCRIPTION OF THE PREFERRED EMBODIMENTS

Figure 1:
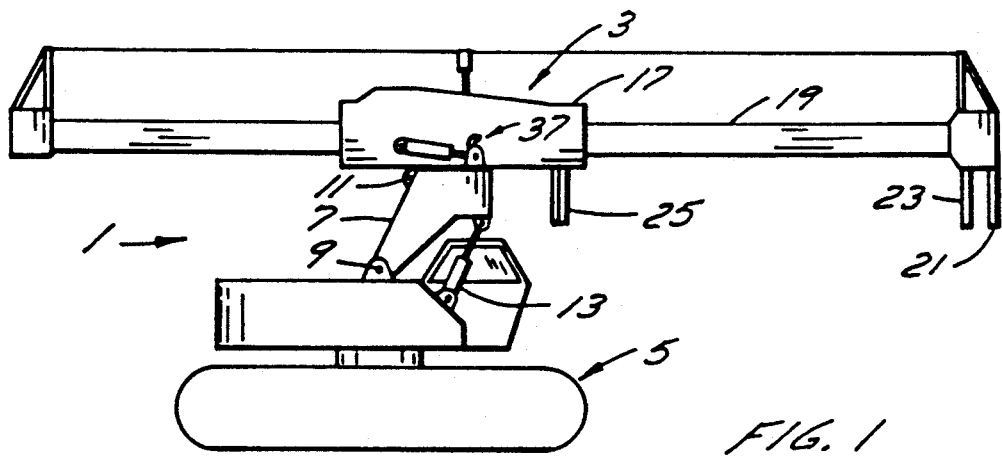
FIG. 1 is a side view of a tree delimbing machine, in a working position, built in accordance with the present invention.
Figure 2:
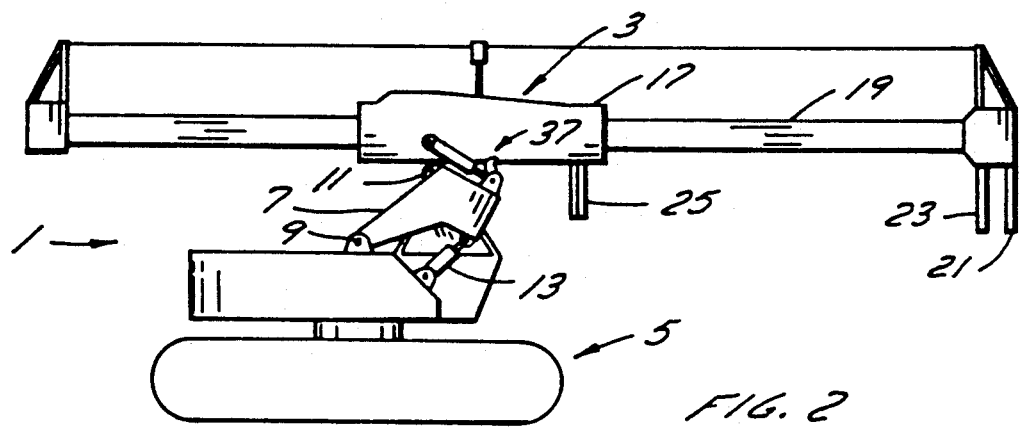
FIG. 2 is a side view of the tree delimbing machine in a travel position.

The tree delimbing machine 1 as shown in FIGS. 1 and 2 has a boom assembly 3 mounted on a vehicle 5 via a boom support 7. The boom support 7 is pivotally mounted at its lower end to the vehicle 5 with pivot means 9. The boom assembly 3 is pivotally mounted on top of the boom support 7 with hinge means 11. Extendable, rigid link means 13 are pivotally connected between the front of the boom support 7 and the vehicle 5. The extendable link means 13 preferably comprises a pair of hydraulic actuators. The link means 13 are normally extended to have the boom support 7 in an upright position, tilted slightly forward, with the boom assembly 3 in a raised, working position as shown in FIG. 1. The link means 13 are retracted to lower the boom support 7 and to place the boom assembly 3 in a lowered, travel position as shown in FIG. 2.

The boom assembly 3 can comprise a sleeve 17 with a boom 19 slidably mounted through the sleeve 17. Tree gripping means 21 and tree delimbing means 23 are mounted on the front end of the boom 19. Tree gripping means 25 are mounted on the front end of the sleeve 17. Means (not shown) are provided for moving the boom 19 through the sleeve 17 so as to move the tree gripping means 21 and the tree delimbing means 23 on the front end of the boom 19 toward or away from the tree gripping means 25 on the sleeve 17. In some cases, the tree gripping means 21 and the tree delimbing means 23 may be the same means.

Figure 3:
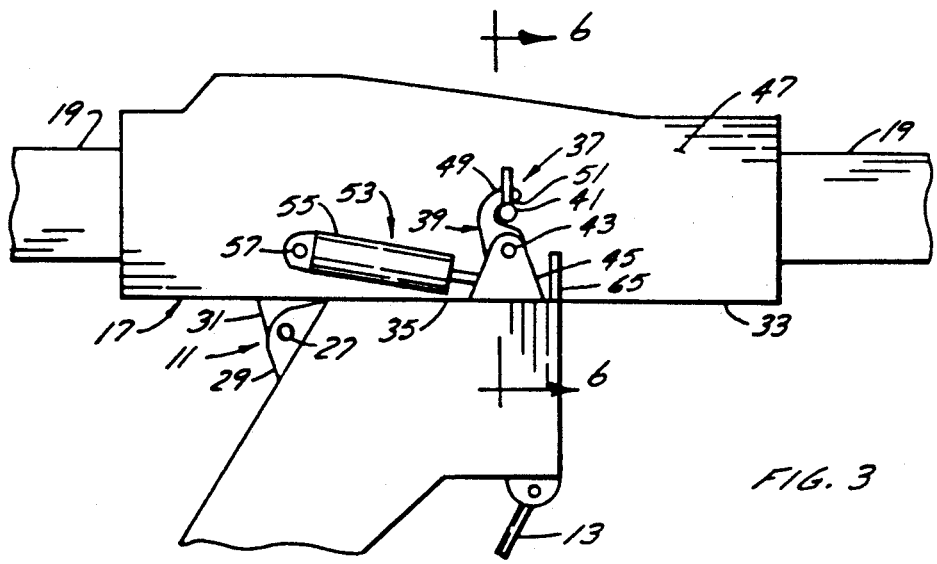
FIG. 3 is a detail side view of the latch means in a first, locked position.

The hinge means 11 pivotally connecting the boom assembly 3 to the boom support 7 is preferably located at the top, rear portion of the boom support 7 and has a horizontal pivot pin 27 connecting rearwardly extending brackets 29 on the boom support 7 and downwardly extending brackets 31 on the sleeve 17 of the boom assembly 3 as shown in FIG. 3. In the working position of the machine, the bottom surface 33 of the sleeve 17 of the boom assembly 3 rests on the top surface 35 of the boom support 7.

Figure 4:
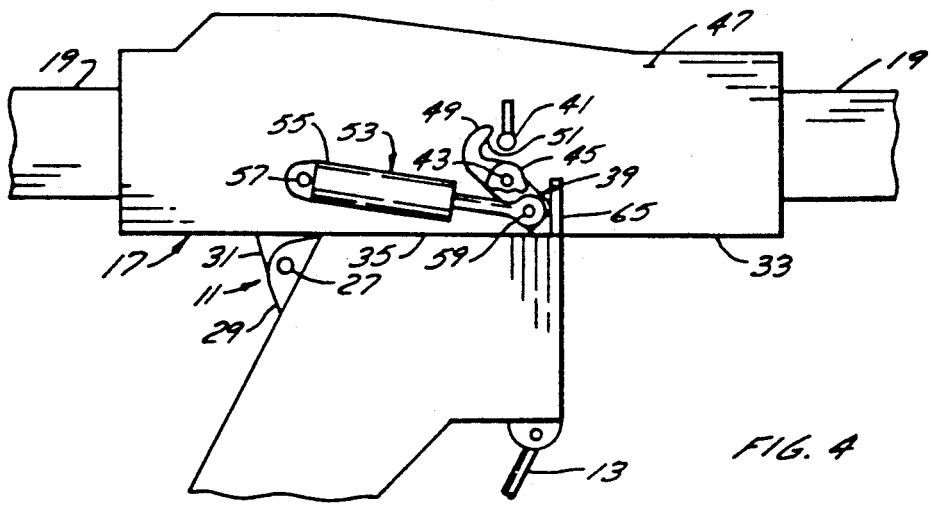
FIG. 4 is a detail side view of the latch means in a second, unlocked position with a bracket partially removed.

Locking means 37 are provided for locking the boom assembly 3 to the boom support 7 in the working position of the boom assembly. Identical locking means 37 are preferably located on each side of the delimbing machine. Each locking means 37 comprises a movable latch 39 mounted on one of the boom assembly 3 and the boom support 7, and a cooperating locking pin 41 mounted on the other of the boom assembly 3 and the boom support 7. As shown in FIGS. 3 and 4 the latch 39 is pivotally mounted intermediate its ends with a pivot pin 43 to a bracket 45 fixed on the top 35 of the boom support 7. The locking pin 41 projects laterally from the sidewall 47 of the sleeve 17. The latch 39 has a forwardly projecting hook 49 at its top end. The bottom surface of the hook 49 forms a camming surface 51. The latch 39 is movable about pivot pin 43 to a first position where the hook 49 slides over the locking pin 41 with the camming surface 51 on the hook 49 forcing the pin 41 down to tightly clamp the sleeve 17, and thus the boom assembly 3, against the top 35 of the boom support 7 as shown in FIG. 3. The latch 39 is movable about pivot pin 43 to a second position where the hook 49 is slid off the locking pin 41 as shown in FIG. 4. In the second position, the boom assembly 3 can now pivot about hinge means 11 relative to the boom support 7 when the boom assembly 3 is moved to a travel position as will be described. The locking means 37 permit the boom assembly to be quickly and easily locked to, or unlocked from, the boom support.

The latch 39 can be moved manually between the first and second positions. Preferably however, the latch 39 is moved with moving means 53 mounted on the machine. The moving means 53 preferably comprises an extendable, rigid link means 55 connected at one end by pivot means 57 to the sleeve 17 and connected at its other end by pivot means 59 to the lower end of the latch 39. The pivot means 57 are preferably located above the hinge means 11 and the link means 55 extend generally parallel to the boom assembly 3 closely adjacent the sleeve placing the link means 55 in a generally protected position on the machine. Retraction of link means 55 rotates the latch 39 about its pivot 43 to move the hook 49 over the locking pin 41 to the first position to clamp the boom assembly 3 to the boom support 7. Extension of link means 55 rotates the latch 39 off the locking pin 41 to the second position allowing the boom assembly 3 to pivot relative to the boom support 7. The link means 55 preferably comprise a hydraulic actuator. The latch moving means simplifies locking and unlocking of the boom assembly to the boom support.

Figure 5:
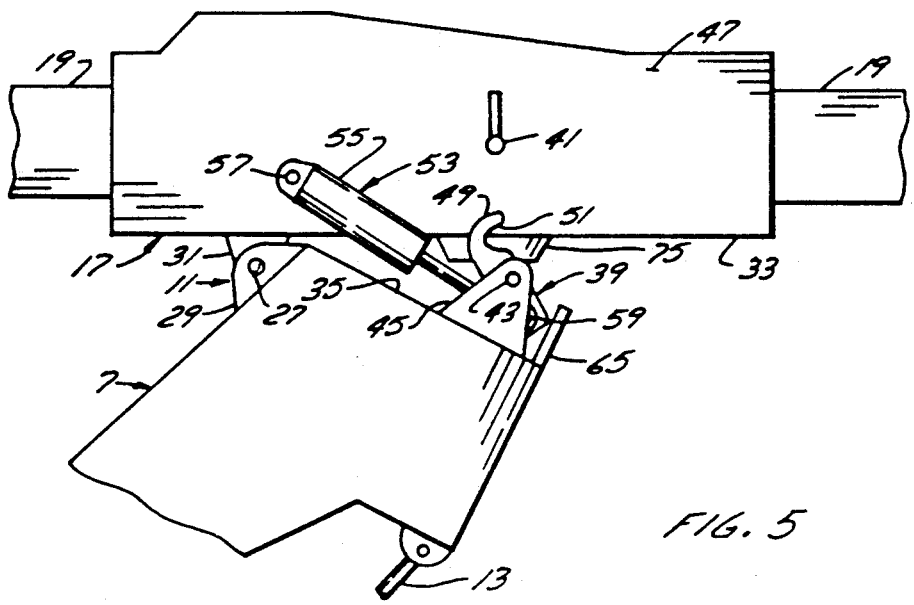
FIG. 5 is a detail side view of the latch means in a second, unlocked position and with the moving means in an extended position.

Pivoting means are provided for pivoting the boom assembly 3 relative to the boom support 7 when the latch 39 is in its second or unlocked position. These pivoting means can comprise another extendable rigid link means (not shown) pivotally connected between the boom assembly 3 and the boom support 7 in front of hinge means 11. Preferably however the pivoting means incorporate the moving means 53 thus simplifying and improving the construction. The pivoting means also includes a stop member 65 in the path of movement of the lower end 67 of the latch 39 in its movement from the first position to the second position. The stop member 65 is located on the top 35 of the boom support 7 adjacent bracket 45. The latch 39 abuts the stop 65 after the hook 49 has moved off the locking pin 41. Continued extension of the rigid link means 55 will now apply a force to the pivot means 57 connected to sleeve 17. The force applied to pivot means 57 by link 55 results in a turning moment about hinge means 11, thereby pivoting the boom assembly 3 relative to the boom support 7 as shown in FIG. 5.

Thus, as rigid link means 13 is retracted to lower the boom support 7 and the attached boom assembly 3, the rigid link means 55 is simultaneously extended to unlock the locking means 37, thereby allowing the boom assembly 3 to pivot relative to the boom support 7. Continued extension of the link means 55 then rotates the now unlocked boom assembly 3 away from the boom support 7 about hinge means 11 thereby keeping the boom assembly 3 generally parallel to the ground as it is moved to a lowered travel position shown in FIG. 2.

To return the boom assembly 3 to its working position at a new work site, the rigid link means 13 is extended raising the boom support 7 and the attached boom assembly 3. Simultaneously the link means 55 is initially shortened by connecting it to a hydraulic circuit and by allowing the boom assembly 3 to fall down under its own weight onto the top 35 of boom support 7. The link means 55 is then further retracted by applying hydraulic fluid once the boom assembly 3 rests on top of the boom support 7 so as to pivot the latch 39 into its first locking position to securely clamp the boom assembly 3 to the boom support 7.

Figure 6:
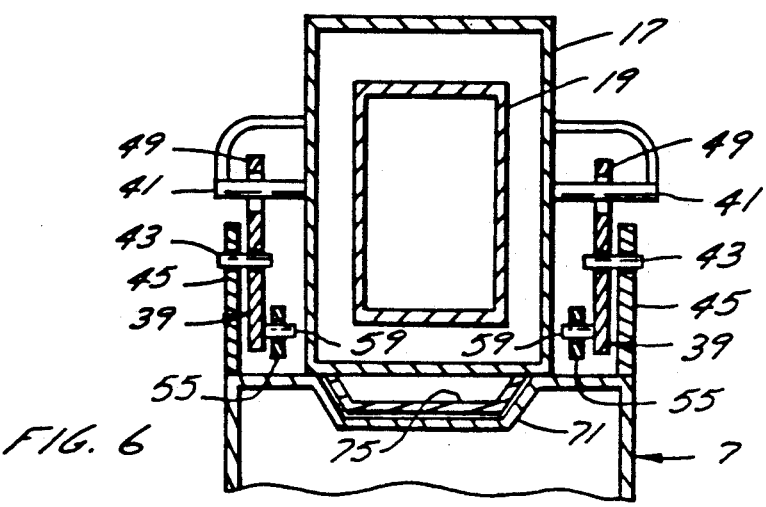
FIG. 6 is a cross-section view taken along line 6—6 in FIG. 3.

Means are provided for laterally centering the boom assembly 3 on the boom support 7 in the working position. These centering means can comprise a tapered depression 71 formed in the center of the top surface 35 of the boom support 7 in front of the pivot means 11 as shown in FIG. 6. The depression 71 is preferably rectangular or square in shape. A short tapered projection 75 that matches the shape of the depression 71 extends downwardly from the bottom surface 33 of the sleeve 17. When the boom assembly 3 is in its working position with the bottom surface 33 of the sleeve 17 adjacent the top surface of the boom support 7, the projection 75 fits snugly into the depression 71 to prevent any lateral movement of the boom assembly relative to the boom support 7 about hinge means 11.

While the invention has been described in relation to a delimbing machine, the invention can be applied to the mounting of any type of boom assembly on a boom support.

I claim:

1. An improved boom construction having: a boom support; a boom assembly; hinge means pivotally connecting the boom assembly to the boom support; locking means having a first part mounted on one of the boom support and boom assembly and a second part mounted on the other of the boom support and boom assembly; one of the first and second parts of the locking means movable between a first position and a second position relative to the other of the first and second parts of the locking means, the locking means in the first position locking the boom assembly to the boom support with the boom assembly in a working position, the locking means in the second position allowing the boom assembly to pivot about the hinge means relative to the boom support.

2. An improved boom construction as claimed in claim 1 including pivoting means connected between the boom assembly and the boom support for pivoting the boom assembly about the hinge means relative to the boom support when the locking means are in the second position.

3. An improved boom construction as claimed in claim 1 including moving means for moving the movable part of the locking means between the first position and the second position.

4. An improved boom construction as claimed in claim 3 including pivoting means connected between the boom assembly and the boom support for pivoting the boom assembly about the hinge means relative to the boom support when the locking means are in the second position.

5. An improved boom construction as claimed in claim 4 wherein the pivoting means incorporates the moving means.

6. An improved boom construction as claimed in claim 5 wherein the moving means comprise at least one extendable, rigid link.

7. An improved boom construction as claimed in claim 6 wherein the rigid link is pivotally connected between the boom assembly and the locking means, the rigid link extending generally parallel to the boom assembly and pivotally connected to the boom assembly above the hinge means.

8. An improved boom construction as claimed in claim 7 including stop means on the boom support at the second position of the locking means for stopping movement of the locking means by extension of the rigid link, continued extension of the rigid link after stopping movement of the locking means pivoting the boom assembly away from the boom support about the hinge means.

9. An improved boom construction as claimed in claim 1 wherein the first part of the locking means comprises at least one pivotally mounted latch and the second part of the locking means comprises at least one fixedly mounted, cooperating, locking pin.

10. An improved boom construction having: a boom support; a boom assembly; hinge means pivotally connecting the boom assembly to the boom support; moving means for pivoting the boom assembly relatively to the boom support about the hinge means; the moving means pivotally connected between the boom assembly and the boom support with its connection to the boom assembly located above the hinge means and with the moving means extending generally parallel to the boom assembly.

11. An improved boom construction as claimed in claim 10 wherein the moving means comprises at least one extendable, rigid link on the side of the boom assembly.

12. An improved tree delimber having: a boom support; a delimbing boom assembly; hinge means pivotally connecting the delimbing boom assembly to the top of the boom support with the delimbing boom assembly resting on the boom support in its working position; locking means for locking the delimbing boom assembly to the boom support in its working position to prevent the boom assembly from pivoting about the hinge means away from the top of the boom support; and moving means for moving the locking means to unlock the boom assembly from the boom support to allow the boom assembly to pivot about the hinge means away from the top of the boom support.

13. An improved tree delimber as claimed in claim 12 wherein the moving means, after unlocking the locking means, moves to pivot the boom assembly about the hinge means away from the top of the boom support.

14. An improved tree delimber as claimed in claim 13 wherein the moving means comprise extendable, rigid link means pivotally connected between the boom assembly and the locking means, the link means pivotally connected to the boom assembly above the hinge means.

15. An improved tree delimber as claimed in claim 14 including stop means on the boom support for stopping movement of the locking means after it has been moved by the extending link means to unlock the boom assembly from the boom support, and wherein further extending of the link means causes it to push against the stop means and to pivot the boom assembly about the hinge means.

16. An improved tree delimber as claimed in claim 12 wherein the locking means comprises at least one latch pivotally connected to one of the boom support and boom assembly, and at least one cooperating locking pin fixedly connected to the other of the boom support and boom assembly.

17. An improved tree delimber having a boom support; a delimbing boom assembly; hinge means pivotally connecting the delimbing boom assembly to the top of the boom support with the delimbing boom assembly resting on the top of the boom support in its working position; and cooperating means on the boom assembly and boom support for preventing lateral movement between them when the boom assembly rests on top of the boom support in its working position.

18. An improved tree delimber as claimed in claim 17 wherein the cooperating means comprise a tapered projection projecting from one of the boom assembly and boom support in front of the hinge means and a mating recess on the other of the boom assembly and boom support for receiving the projection.

19. An improved tree delimber as claimed in claim 17 including locking means movable between a first position and a second position, the locking means in the first position locking the boom assembly to the boom support with the boom assembly in the working position, locking means in the second position allowing the boom assembly to pivot about the hinge means relative to the boom support.

* * * * *